(12) United States Patent
Skrzypczak et al.

(10) Patent No.: US 9,150,738 B2
(45) Date of Patent: Oct. 6, 2015

(54) PROCESS FOR THE PRODUCTION OF PRECIPITATED CALCIUM CARBONATE, PRECIPITATED CALCIUM CARBONATE AND USES THEREOF

(75) Inventors: Mathieu Skrzypczak, Saint-Louis (FR); Marc Maurer, Village-Neuf (FR); Thomas Schmölzer, Villach (AT)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/125,630

(22) PCT Filed: Jun. 19, 2012

(86) PCT No.: PCT/EP2012/061698
§ 371 (c)(1),
(2), (4) Date: Jan. 30, 2014

(87) PCT Pub. No.: WO2012/175490
PCT Pub. Date: Dec. 27, 2012

(65) Prior Publication Data
US 2014/0366777 A1 Dec. 18, 2014

Related U.S. Application Data

(60) Provisional application No. 61/501,890, filed on Jun. 28, 2011.

(30) Foreign Application Priority Data

Jun. 21, 2011 (EP) ..................... 11170652

(51) Int. Cl.
*C09C 1/02* (2006.01)
*C01F 11/18* (2006.01)
*C09D 7/12* (2006.01)
*C08K 3/26* (2006.01)

(52) U.S. Cl.
CPC ............ *C09D 7/1216* (2013.01); *C01F 11/181* (2013.01); *C08K 3/26* (2013.01); *C09C 1/021* (2013.01); *C01P 2004/03* (2013.01); *C01P 2004/30* (2013.01); *C01P 2004/38* (2013.01); *C01P 2004/61* (2013.01); *C01P 2006/12* (2013.01); *C01P 2006/40* (2013.01); *C08K 2003/265* (2013.01)

(58) Field of Classification Search
CPC ....... C09C 1/021; C09C 1/022; C01F 11/181; C01P 2004/03; C01P 2004/30; C01P 2004/38; C01P 2004/61; C01P 2006/12; C01P 2006/40; C09D 7/1216; C08K 3/26; C08K 2003/265
USPC ................................ 106/464, 465
See application file for complete search history.

(56) References Cited

U.S. PATENT DOCUMENTS

| 4,888,160 | A | | 12/1989 | Kosin et al. |
| 5,695,733 | A | * | 12/1997 | Kroc et al. ................ 423/432 |
| 6,022,517 | A | | 2/2000 | Fairchild et al. |
| 6,221,146 | B1 | | 4/2001 | Fortier et al. |
| 6,540,878 | B1 | | 4/2003 | Leino |
| 6,790,424 | B2 | * | 9/2004 | Jasra et al. ................ 423/274 |
| 6,989,142 | B2 | * | 1/2006 | Liu et al. .................... 424/49 |
| 7,135,157 | B2 | * | 11/2006 | Huhn, III .................. 423/432 |
| 7,361,324 | B2 | * | 4/2008 | Liu et al. .................. 423/432 |
| 2004/0054042 | A1 | | 3/2004 | Iwamoto et al. |
| 2004/0241076 | A1 | | 12/2004 | Huhn, III |

FOREIGN PATENT DOCUMENTS

| EP | 1712523 A1 * | 10/2006 |
| GB | 1419000 | 12/1975 |
| JP | 4031314 B2 | 1/2008 |
| WO | WO2008/128545 A1 * | 10/2008 |

OTHER PUBLICATIONS

The International Search Report dated Aug. 10, 2012 for PCT Application No. PCT/EP2012/061698.
The Written Opinion of the International Searching Authority dated Aug. 10, 2102 for PCT Application No. PCT/EP2012/061698.
The Communication dated Dec. 6, 2011 for EP 11170652.9.
The Communication dated Feb. 11, 2014 for EP 11170652.9.
Garcia et al. "Rhombohedral-scalenohedral calcite transition produced by adjusting the solution electrical conductivity in the system Ca(OH)2-CO2-H2O." Journal of Colloid and Interface Science 261 (2003) 434-440.
The Office Action for Colombian Application No. 13-291991-3.
The Office Action dated Sep. 16, 2014 for Chinese Application No. 201280030145.5.
The Examination Report dated Dec. 30, 2014 for Arab Application No. GC 2012-21573.

(Continued)

*Primary Examiner* — Anthony J Green
(74) *Attorney, Agent, or Firm* — Amster, Rothstein & Ebenstein LLP

(57) ABSTRACT

The present invention relates to a process for the production of precipitated calcium carbonate, comprising the following steps: a) providing a reaction vessel containing an aqueous phase at an initial temperature; b) injecting a carbon dioxide generating compound into the aqueous phase until the pH of the aqueous phase is in the range of around 5 to around 7; and c) subsequently adding a calcium hydroxide slurry at an initial temperature to the reaction vessel while continuing the injection of the carbon dioxide generating compound, in order to obtain an aqueous slurry of the precipitated calcium carbonate. The addition rate of the calcium hydroxide slurry to the reaction vessel in step c) is such that an average electrical conductivity of the reaction contents in the reaction vessel during the reaction is in a range of 100 to 6 000 μS/cm.

47 Claims, 3 Drawing Sheets

(56) References Cited

OTHER PUBLICATIONS

The Office Action dated Mar. 17, 2015 for Korean Application No. 9-5-2015-017700254.

The Examination Report dated May 22, 2014 for Taiwanese Application No. 101121287.

* cited by examiner

PROCESS FOR THE PRODUCTION OF PRECIPITATED CALCIUM CARBONATE, PRECIPITATED CALCIUM CARBONATE AND USES THEREOF

CROSS-REFERENCE TO RELATED APPLICATIONS

This application is a U.S. national phase of PCT Application No. PCT/EP2012/061698, filed Jun. 19, 2012, which claims priority to European Application No. 11170652.9, filed Jun. 21, 2011 and U.S. Provisional Application No. 61/501,890, filed Jun. 28, 2011.

TECHNICAL FIELD OF THE INVENTION

The present invention relates to a method for the production of precipitated calcium carbonate (PCC), to products produced by the process of the invention as well as to their use. More particularly, the invention relates to a process for the production of precipitated calcium carbonate using a carbonation process, where the crystal habit of the precipitated calcium carbonate can be controlled and to products produced by the process.

BACKGROUND OF THE INVENTION

Calcium carbonate is used extensively in the paper industry as a filler component in paper. It is a low cost, high brightness filler used to increase sheet brightness and opacity. Its use has increased dramatically in the last decades due to the conversion from acid to alkaline papermaking at paper mills. Both natural and synthetic calcium carbonates are used in the paper industry. Natural carbonate, or limestone, is ground to a small particle size prior to its use in paper, while synthetic calcium carbonate is manufactured by a precipitation reaction and is therefore called precipitated calcium carbonate (PCC).

Besides its use in the papermaking industry, precipitated calcium carbonate is also used for various other purposes, e.g. as filler or pigment in the paint industries, and as functional filler for the manufacture of plastic materials, plastisols, sealing compounds, printing inks, rubber, toothpaste, cosmetics, etc.

Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as diverse assortment of thin elongated prismatic, curved bladed, steep pyramidal, chisel shaped crystals, branching tree, and coral or worm-like form.

Usually, PCC is prepared by introducing $CO_2$ into an aqueous suspension of calcium hydroxide, the so-called milk of lime

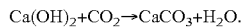

$$Ca(OH)_2 + CO_2 \rightarrow CaCO_3 + H_2O.$$

This process has demonstrated the capability to produce PCC with superior opacifying characteristics. PCC is typically superior in opacifying and brightening the sheet, and also as filler and/or bulk in the sheet of paper, compared to ground calcium carbonate (so-called GCC).

Alternatively, it is also known to prepare precipitated calcium carbonate by introducing an aqueous suspension of calcium hydroxide into carbonated water. Such a process can be named as an "inverse" carbonation process.

Kosin et al. describes in U.S. Pat. No. 4,888,160 an "inverse" carbonation process for the production of cuboidal calcium carbonate in a reaction vessel with a recycle piping system. The aqueous suspension of calcium hydroxide is introduced into carbonated water having a pH of 6 at a rate so that the pH of the resultant slurry formed is in a range between 8 and 9. The resultant calcium carbonate has a cuboidal shape and an average particle size of 1 to 3 μm.

Another "inverse" carbonation process for the production of cubic calcium carbonate is disclosed by Masaru et al. in JP 4031314. In this process, an aqueous calcium hydroxide slurry at a temperature of 20 to 80° C. is slowly added—at a rate of 0.001 to 0.01 fold/minute per volume of carbonated water—to carbonated water at a temperature of 20 to 60° C. until the reaction reaches a pH of 11 or less. Then the reaction product is filtered and dried. The resultant calcium carbonate has an average particle size of 1 to 10 μm.

The disadvantages of the above described "inverse" carbonation processes are the low addition rate needed to obtain the desired product as well as the low solid content of the obtained slurry.

Accordingly, there exists a need to develop an "inverse" carbonation process where the crystal habit of the resulting precipitated calcium carbonate can be governed and where a higher solid content of the precipitated calcium carbonate in the resulting slurry can be achieved. In other words, there exists a need to provide a more economical process for the production of precipitated calcium carbonate via an "inverse" carbonation process compared to the processes already known in the art.

SUMMARY OF THE INVENTION

It is therefore an object of the present invention to provide a process for the production of precipitated calcium carbonate which produces a precipitated calcium carbonate that can have other crystal habits than those produced by the known "inverse" carbonation processes.

More particularly, it is an object of the present invention to provide an "inverse" carbonation process for the production of prismatic precipitated calcium carbonate (P-PCC).

It is an additional object of the present invention to provide an "inverse" carbonation process for the production of scalenohedral precipitated calcium carbonate (S-PCC).

It is yet an additional object of the present invention to provide an "inverse" carbonation process for the production of colloidal precipitated calcium carbonate (c-PCC).

It is a further object of the present invention to provide the various precipitated calcium carbonate products.

These and additional objects are provided by the process according to the present invention for the production of precipitated calcium carbonate by an "inverse" carbonation process.

The process according to the present invention requires that the addition rate of the calcium hydroxide slurry to the reaction vessel is such that an average conductivity of the reaction contents in the reaction vessel during the reaction is in a range of 100 to 6 000 μS/cm.

These and additional objects and advantages will be more fully understood in view of the following detailed description.

DETAILED DESCRIPTION OF THE INVENTION

Figure 1:
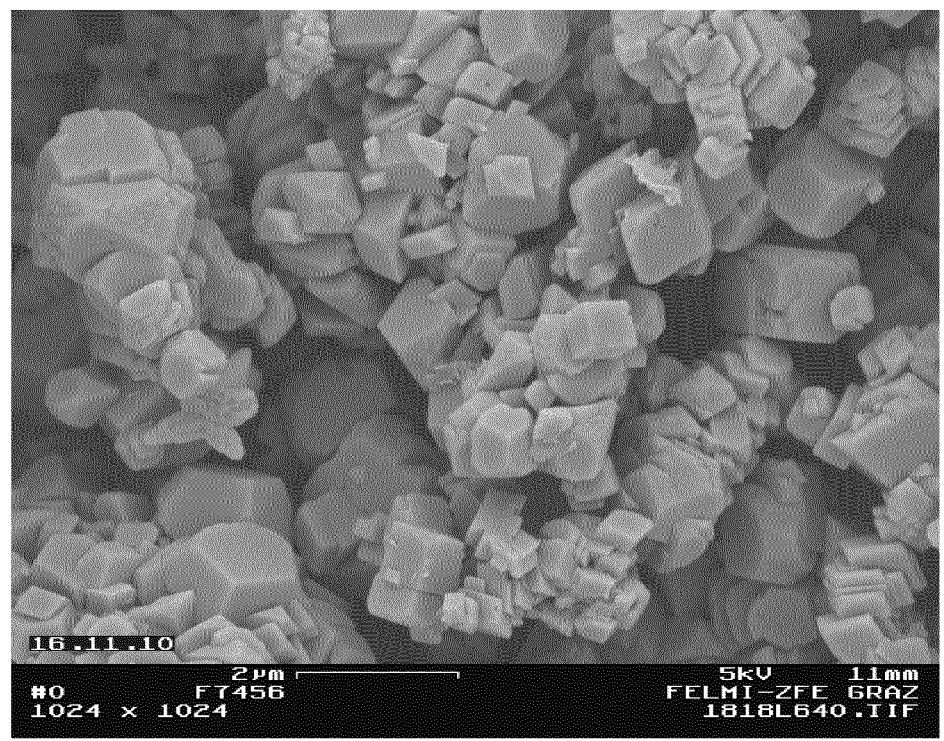
FIG. 1 is a SEM photomicrograph of prismatic-shaped PCC that was obtained according to the invention by the carbonation process described in Example 5.
Figure 2:
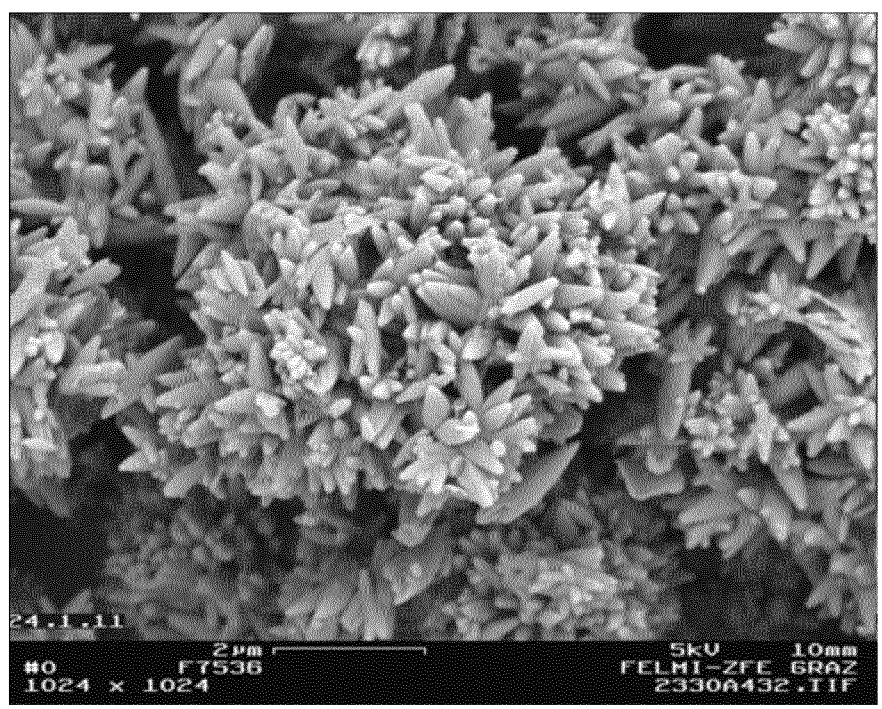
FIG. 2 is a SEM photomicrograph of scalenohedral-shaped PCC having rosette-like aggregate structure that was obtained according to the invention by the carbonation process described in Example 12.
Figure 3:
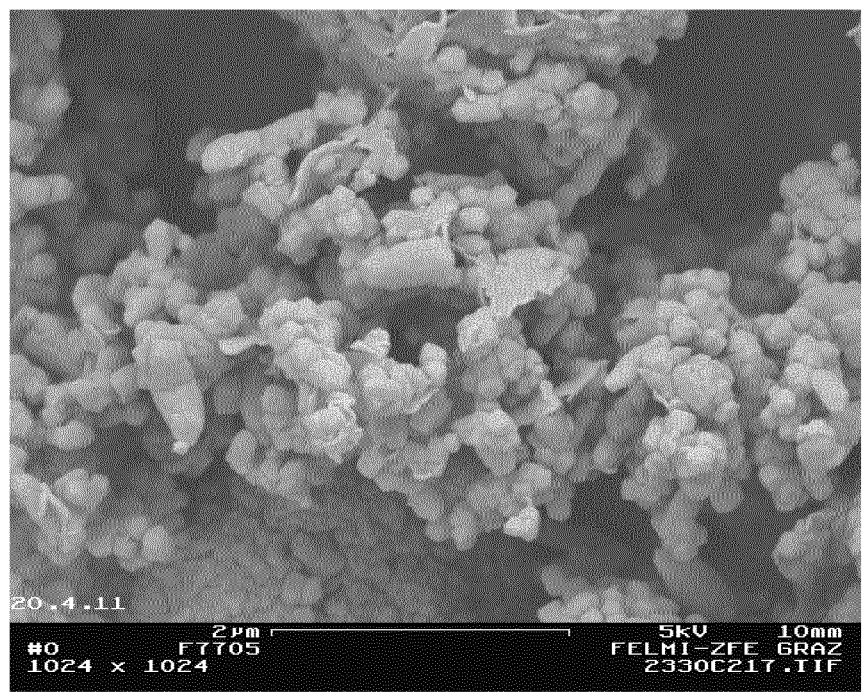
FIG. 3 is a SEM photomicrograph of colloidal PCC that was obtained according to the invention by the carbonation process described in Example 15.

All parts, percentages and ratios used herein are expressed by weight unless otherwise specified. All documents cited herein are incorporated by reference.

As employed in the present description and claims, the term "colloidal PCC" (chemical formula: $CaCO_3$) designates a PCC product in the form of aggregates/agglomerates of individual PCC particles in which the aggregates/agglomerates have a surface area of at least 5 m²/g as determined by the BET method (Brunauer, Emmet, Teler, ISO 9277). The aggregates/agglomerates preferably have an equivalent spherical particle size (median particle size, MPS) in the range about 0.1-5.0 μm, e.g. about 0.2-4 μm, typically about 0.5-3.0 μm, as determined e.g. by sedimentation on a Sedigraph 5100 from Micromeritics. The aggregates'/agglomerates' BET surface area will typically be up to about 100 m²/g, more typically up to about 80 m²/g, e.g. up to about 50 m²/g, e.g. up to about 30 m²/g and typically at least about 5 m²/g, e.g. at least about 10 m²/g. The aggregates/agglomerates consist of a greater or smaller number of single crystals having an equivalent spherical particle size of, typically, about 0.01-0.50 μm.

A "slurry" in the meaning of the present invention is a suspension (comprising essentially insoluble solids and water and optionally further additives) and usually has a higher density than the liquid without solids from which it is formed.

A "specific surface area" (SSA) or "BET specific surface area" in the meaning of the present invention relates to the specific surface area measured via the method provided in the examples section hereafter.

The term "brightness" as used in the context of the present invention is a measurement of the percentage of diffuse light reflected from a powder tablet produced from a pigment. A brighter pigment reflects more diffuse light. As used herein, brightness of the pigment may be measured at a wavelength of light of 457 nm (R457) and is specified in percent.

Considering the drawbacks of known "inverse" carbonation processes, it is an objective to provide a process for the production of precipitated calcium carbonate which produces a precipitated calcium carbonate that has other crystal habits than those produced by the known "inverse" carbonation processes.

The object outlined above has been solved by a process for production of precipitated calcium carbonate, comprising the following steps: a) providing a reaction vessel containing an aqueous phase at an initial temperature; b) injecting a carbon dioxide generating compound into the aqueous phase until the pH of the aqueous phase is in the range of around 5 to around 7; and c) subsequently adding a calcium hydroxide slurry at an initial temperature to the reaction vessel while continuing the injection of the carbon dioxide generating compound, in order to obtain an aqueous slurry of the precipitated calcium carbonate, wherein in step c) the addition rate of the calcium hydroxide slurry to the reaction vessel is such that an average electrical conductivity of the reaction contents in the reaction vessel during the reaction is in a range of 100 to 6 000 μS/cm.

In view of the foregoing, the inventors of the present invention have surprisingly found that the different crystal habits of precipitated calcium carbonate produced by an "inverse" carbonation process can be governed by controlling the addition rate of the calcium hydroxide slurry. The addition rate of the calcium hydroxide slurry is linked to the average electrical conductivity of the reaction contents during the reaction, the average conductivity being monitored during the reaction.

Without wishing to being bound to this theory, the inventors of the present invention believe that the average electrical conductivity of the reaction contents is mainly governed by the concentration of free $Ca^{2+}$-ions and $(OH)^-$-ions in the reaction contents, the free $Ca^{2+}$-ions and $(OH)^-$-ions being derived from the following reaction:

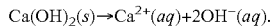

$$Ca(OH)_2(s) \rightarrow Ca^{2+}(aq) + 2OH^-(aq).$$

It is pointed out that the person skilled in the art is aware of the fact that the electrical conductivity of the reaction contents is also dependent on the quality of the water, i.e. the hardness of the water which is depending on the concentrations of $Ca^{2+}$ and $Mg^{2+}$ ions dissolved in the water, as well as of other ions originating from the raw material from which the calcium hydroxide slurry is formed.

For the purpose of the present invention, the "reaction contents" are defined as the contents included in the reaction vessel during the reaction, including the aqueous phase, the carbon dioxide generating compound, the calcium hydroxide slurry, already formed precipitated calcium carbonate as well as optional additives which can be added during the reaction. Hence, it is clear to the person skilled in the art that the initial electrical conductivity of the aqueous phase will be higher when hard water (high concentrations of $Ca^{2+}$ and $Mg^{2+}$ ions) is used, and lower when soft water (low concentrations of $Ca^{2+}$ and $Mg^{2+}$ ions) is used.

When the addition rate of the calcium hydroxide slurry to the carbonated water is rather high, i.e. the amount of calcium hydroxide slurry added is higher than the amount of carbon dioxide generating compound, e.g. $CO_2$, added, then free $Ca^{2+}$-ions remain in excess in solution. In this case the average electrical conductivity increases due to these free ions and is usually found to be in the range of greater than 1 200 to 6 000 μS/cm.

When the addition rate of the calcium hydroxide slurry to the carbonated water is rather low, i.e. a low amount of calcium hydroxide slurry is added, then all or most of the free $Ca^{2+}$-ions react with the carbon dioxide which leads to a low concentration of free $Ca^{2+}$-ions in the reaction. In this case the average electrical conductivity of the reaction contents observed is found to be low, in particular below or equal to 1 200 μS/cm.

Based on the above, the inventors of the present invention have surprisingly found that by controlling the addition rate of the calcium hydroxide slurry in a range of 100 to 6 000 μS/cm, one can obtain precipitated calcium carbonate showing other crystal habits than those known from prior art processes which only lead to cubic or cuboidal PCCs. For example, one can obtain prismatic precipitated calcium carbonate and scalenohedral calcium carbonate.

Another advantage of the present invention consists in that there is no need for the introduction of seeds to the reaction contents in order to obtain the desired crystal habit of the resulting precipitated calcium carbonate.

The pH of the aqueous slurry of the precipitated calcium carbonate is preferably in the range of 7 to 13, and more preferably in the range of 7 to 12. It is noted that the pH value can be used as an indirect indication of the electrical conductivity of the reaction contents, i.e. high pH means a high concentration of free OH⁻-ions, and can help control the crystal habit of the resulting precipitated calcium carbonate. However, it is stressed that the measurement of the average electrical conductivity has to be regarded as a more precise tool for the control of the crystal habit of the resulting precipitated calcium carbonate.

In an embodiment of the inventive process, the addition rate of the calcium hydroxide slurry in step c) is at least 0.02 fold/minute per volume of carbonated aqueous phase, and preferably in the range of 0.02 to 0.25 fold/minute per volume of carbonated aqueous phase, and more preferably in the range of 0.025 to 0.10 fold/minute per volume of carbonated aqueous phase, for example 0.05 fold/minute per volume of carbonated aqueous phase, or 0.075 fold/minute per volume of carbonated aqueous phase or 0.10 fold/minute per volume of carbonated aqueous phase. These addition rates lead to average conductivities in the range of 100 to 6 000 µS/cm. Moreover, by these addition rates the pH of the precipitated calcium carbonate can be controlled to be in a range of 7 to 13. For the purpose of the present invention the term "fold/minute per volume of carbonated aqueous phase" refers to the addition rate of the calcium hydroxide slurry and is independent of the size of the reaction vessel. The unit of this addition rate is usually expressed in 1/min. For example, when the volume of carbonated aqueous phase is 2 liters, then an addition rate in the range of 0.02 to 0.25 fold/minute per volume of carbonated aqueous phase corresponds to an addition rate of the calcium hydroxide slurry of 0.04 to 0.5 l/min. In the case of 8 liters of carbonated aqueous phase, the addition rate in the range of 0.02 to 0.25 fold/minute per volume of carbonated aqueous phase corresponds to an addition rate of the calcium hydroxide slurry of 0.16 to 2.0 l/min.

In a preferred embodiment of the inventive process, the carbon dioxide generating compound in step c) is introduced in the reaction vessel at a rate of 0.05 to 2 kg $CO_2$/h per kg of dry $Ca(OH)_2$, and preferably between 0.2 to 0.8 kg $CO_2$/h per kg of dry $Ca(OH)_2$.

Preferably, the reaction vessel used has a defined filling volume, and the total amount or volume of calcium hydroxide slurry added in step c) amounts to at least 10% of the filling volume of the reaction vessel. The advantage of this consists in that the resulting precipitated calcium carbonate slurry has a high solid content. Consequently, there is no need to further concentrate the final product before selling it. However, if required, then the aqueous suspension comprising the precipitated calcium carbonate can be submitted to further post treatments, comprising separating, filtering, and drying, in order to obtain the dried precipitated calcium carbonate, or milling.

In another embodiment, the initial temperature of the aqueous phase is in a range of about 0 to about 95° C., and preferably in a range of about 10 to about 70° C., and more preferably in a range of about 30 to about 50° C. By an initial temperature of the aqueous phase of about 0° C. it is meant that the aqueous phase is in its fluid state and not in its solid state.

In a further embodiment, the initial temperature of the calcium hydroxide slurry is in the range of about 10 to about 90° C., and preferably in the range of about 30 to about 80° C., and more preferably in the range of about 50 to about 70° C.

It will be apparent to the person skilled in the art that the initial temperature of the calcium hydroxide slurry and the water used is not necessarily the same one as in the reactor during the reaction due to the mixing temperature when mixing substances of different temperatures.

In a preferred embodiment of the invention, the carbon dioxide generating compound used is selected from among gaseous carbon dioxide, liquid carbon dioxide, solid carbon dioxide and a gas containing carbon dioxide, and preferably the carbon dioxide generating compound is a gaseous mixture of carbon dioxide and air, or carbon dioxide and nitrogen. When the gaseous mixture of carbon dioxide and air or the gaseous mixture of carbon dioxide and nitrogen is used, then the carbon dioxide is present in the range of 8 to 99% by volume, and preferably in the range of 12 to 25% by volume, for example 20% by volume.

The calcium hydroxide slurry is preferably an aqueous calcium hydroxide slurry and has a solid content of between 1 and 30% by weight, preferably between 5 and 25% by weight, and more preferably between 10 and 20% by weight.

In yet a preferred embodiment of the invention, the suspension of the aqueous slurry of the precipitated calcium carbonate obtained in step (c) has a solid content between 5 and 30% by weight, preferably between 7 and 25% by weight, and more preferably between 10 and 20% by weight.

In a preferred embodiment of the present invention, the precipitated calcium carbonate has a weight median grain diameter ($d_{50}$) in a range of about 1.0 to about 9.0 µm, preferably in the range of about 2.5 to 7.5 µm, and most preferably in the range of 3.3 to 6.9 µm.

By the present invention it is possible to obtain precipitated calcium carbonate particles having a weight median grain diameter ($d_{50}$) in the range of 2.5 to 7.5 µm, and more preferable in the range of 3.3 to 6.9 µm. This means that by the present invention it is possible to obtain rather coarse precipitated calcium carbonate particles.

The precipitated calcium carbonate particles obtained by the process according to the present invention have a BET specified surface area in a range of about 1.0 to about 25.0 $m^2/g$, preferably in the range of about 1.3 to about 23.5 $m^2/g$, and more preferably in the range of about 1.3 to 5.0 $m^2/g$.

In a further embodiment of the present invention, an additive is added to the reaction vessel after step a) or after step b) but prior to step c).

The additive is preferably one selected from the group comprising slaking additives, and precipitation additives that are well known to the person skilled in the art. Examples of the additive are sugars, e.g. sucrose, sugar alcohols, e.g. meritol, citric acid or sodium, potassium, calcium or magnesium salts of citric acid, and polyacrylic acids in their neutralized or partly neutralized forms. It is also noted that besides the afore-mentioned polyacrylic acids in their neutralized or partly neutralized forms other dispersing agents that are well known to the person skilled in the art can also be used as additives in the process of the present invention.

In a preferred embodiment of the present invention, the average conductivity is controlled in a range of about 100 to about 1 200 µS/cm, and preferably in a range of about 200 to about 1 010 µS/cm.

In another preferred embodiment of the present invention, the average conductivity is controlled in range of greater than about 1 200 to about 6 000 µS/cm, and preferably in a range of about 1 300 to about 3 000 µS/cm, and more preferably in a range of about 1 300 to 2 500 µS/cm.

The inventors have surprisingly found that when the average electrical conductivity of the reaction contents is in a range of about 100 to about 1 200 µS/cm, then the resulting precipitated calcium carbonate is prismatic precipitated calcium carbonate (P-PCC), and that when the average electrical conductivity of reaction contents is in a range of greater than about 1 200 to about 6 000 μS/cm, then the resulting precipitated calcium carbonate is scalenohedral precipitated calcium carbonate (S—PCC) or colloidal precipitate calcium carbonate (c-PCC). It is noted that the colloidal precipitated calcium carbonate is preferably formed during the process of the invention when there is an additive, such as a sugar, e.g. sucrose, present in the tab water prior to the introduction of calcium hydroxide slurry.

In a further preferred embodiment of the present invention, the process is either carried out in a batch mode, a semi-batch mode or a continuous mode.

In addition, the inventive process preferably comprises a further step where the precipitated calcium carbonate obtained in step c) is dried to form precipitated calcium carbonate.

Another advantage of the present invention is the pH stability of the resulting precipitated calcium carbonate, which is stable in a broad pH range of 7 to 12.

The present invention is also directed to the precipitated calcium carbonate obtained by the inventive process as well as directed to an aqueous suspension comprising the precipitated calcium carbonate obtained by the inventive process.

Moreover, the present invention is directed to a dried precipitated calcium carbonate obtained by the inventive process.

The invention is also directed to the use of the aqueous suspension in coating formulations or as fillers in the papermaking industry and to the use of the dried precipitated calcium carbonate in the field of paints, rubber, plastics, building materials, inks, water treatment, food, feed, and cosmetic.

EXAMPLES

The following examples are intended to illustrate certain embodiments of the invention and are understood to be non-limiting to the invention in any way.

For the purpose of the present invention, the value of the parameter $d_{50}$(%) is obtained by particle size measurements for which respectively 50% by mass of the particles have a diameter of less than or equal to this value.

Measurement Methods:

Suspension Conductivity Measurement

The conductivity of the suspension was measured directly in the reaction vessel during the reaction using a Mettler Toledo Seven Multi equipped with the corresponding Mettler Toledo conductivity expansion unit and a Mettler Toledo InLab® 730 conductivity probe.

The instrument was first calibrated in the relevant conductivity range using commercially available conductivity calibration solutions from Mettler Toledo. The influence of temperature on conductivity is automatically corrected by the linear correction mode.

Suspension pH Measurement

The pH of the suspension was measured directly in the reaction vessel using a Mettler Toledo Seven Easy pH meter and a Mettler Toledo InLab® Expert Pro pH electrode.

BET Specific Surface Area

The BET specific surface area (also designated as SSA) was determined according to ISO 9277 using a Tristar II 3020 sold by the company MICROMERITICS™.

Particle size distribution (mass % particles with a diameter<X μm) and weight median particle diameter ($d_{50}$) of particulate material ($d_{50}$ (μm)) Sedigraph™ 5100.

The weight median particle diameter and the particle diameter mass distribution of a particulate material were determined via the sedimentation method, i.e. an analysis of sedimentation behavior in a gravimetric field. The measurement is made with a Sedigraph™ 5100 sold by the company MICROMERITICS™.

The method and the instrument are known to the skilled person and are commonly used to determine particle size of fillers and pigments. Samples were prepared by adding an amount of the product corresponding to 4 g dry PCC to 60 ml of an aqueous solution of 0.1% by weight of $Na_4P_2O_7$. The samples were dispersed for 3 minutes using a high speed stirrer (Polytron PT 3000/3100 at 15 000 rpm). Then it was submitted to ultrasound using an ultrasonic bath for 15 minutes and thereafter added to the mixing chamber of the Sedigraph.

Viscosity Measurements

A. Brookfield Viscosity

The Brookfield viscosity was measured after 1 minute of stirring by the use of a RVT model Brookfield™ viscometer at room temperature and a rotation speed of 100 rpm (revolutions per minute) with the appropriate disc spindle 2, 3 or 4.

B. ICI Viscosity According to EN ISO 2884-1

The ICI viscosity was measured according to EN ISO 2884-1 using a cone- and plate viscometer (Epprecht Instruments+Controls, Bassersdorf, Switzerland) at a shear rate of 10 000 1/s at a temperature of $(23\pm0.2)°$ C. The measured value after 15 s, which should be a constant value, depicts the measured viscosity of the probe.

C. Viscosity with a Paar Physica M301 PP25 Rheometer

This measurement was conducted with a Paar Physica M301 PP25 rheometer, from the company Anton Paar GmbH, Austria, according to the following regime:

Temp.: 23° C.

Starting shear rate: 0.1 1/s

End shear rate: 100 1/s, with a gradient of 10 measurement points per decade, and each measurement point taken after 5 seconds.

The measurement points are displayed in a decadic logarithmic manner, so that a linear curve with a negative slope results from this measurement. The x-axis of the graph represents the shear rate in a decadic logarithmic manner, and the y-axis depicts the measured viscosity in Pa·s.

Weight Solids (% by Weight) of a Material in Suspension

The weight solids (also called solids content of a material) was determined by dividing the weight of the solid material by the total weight of the aqueous suspension.

The weight of the solid material was determined by weighing the solid material obtained by evaporating the aqueous phase of the suspension and drying the obtained material to a constant weight.

Gloss of a Coated Surface

The Gloss values are measured at the listed angles according to DIN 67 530 on painted surfaces prepared with a coater gap of 150 μm on contrast cards. The contrast cards used are Leneta contrast cards, form 3-B-H, size 7⅝×11⅜ (194×289 mm), sold by the company Leneta, and distributed by Novamart, Stäfa, Switzerland. The gloss is measured with a gloss measurement device from the company Byk Gardner, Geretsried, Germany. The gloss is obtained by measuring 5 different points on the card with the gloss measurement device, and the average value is calculated by the device and can be derived from the display of the device.

Determination of Colour Values (Rx, Ry, Rz)

The colour values Rx, Ry, Rz are determined over the white and black fields of the Leneta contrast card, and are measured with a spectraflas SF 450× spectrophotomer of the company Datacolor, Montreuil, France.

Contrast Ratio (Opacity) of a Coated Surface

Contrast ratio values are determined according to ISO 2814 at a spreading rate of 7.5 m²/l.

The contrast ratio is calculated as described by the equation below:

$$\text{Contrast ratio } [\%] = \frac{Ry_{black}}{Ry_{white}} \times 100\%$$

with $Ry_{black}$ and $Ry_{white}$ being obtained by the measurement of the colour values.

Example 1

Comparative Example

This example describes a process of the prior art for the production of cuboidal PCC, where the PCC is prepared by the process described in U.S. Pat. No. 4,888,160.

The same recycle piping system as disclosed in FIG. 1 of U.S. Pat. No. 4,888,160 was used. A 8 liter reactor was filled with 2 liters of water having an initial temperature of 30° C. Then, the water was re-circulated through the recycle piping system. Carbon dioxide gas (100 Vol. %) was injected into the recycle stream at a turbulent area in the recycle piping system at a rate of 2.5 l/min. The carbon dioxide injection was continued until the pH of the water was 6.0. While the carbon dioxide injection was continued, 6 l of an aqueous calcium hydroxide slurry was pumped into the reactor at a rate so that the pH of the resultant reaction mixture was maintained between 8 and 9.

The resultant cuboidal calcium carbonate product has a weight median grain diameter ($d_{50}$) of 4.2 μm and a BET specific surface area (SSA) of 2.2 m²/g.

Example 2

Inventive Example

This example demonstrates the production of a prismatic precipitated calcium carbonate (P-PCC) using the process of the present invention.

In this example an 8 liter stainless steel reactor was used. The reaction vessel was closed on the top and enables a gas injection from the bottom of the vessel and injection of calcium hydroxide slurry from the top of the vessel. 2 liters of tap water were provided in the reaction vessel. The initial temperature of the water prior to the gas injection was about 30° C. Gas containing carbon dioxide was injected into the tap water contained in the reaction vessel at a rate of 15 l/min until the pH of the water was approximately 6. The contents of the reaction vessel were stirred at a 1 200 rpm. While the injection of the carbon dioxide containing gas was continued, an aqueous calcium hydroxide slurry, the so-called "milk of lime", was added. The initial temperature of the aqueous calcium hydroxide slurry was about 70° C. The solids content of the aqueous calcium hydroxide slurry was about 14% by weight. The addition rate of the aqueous calcium hydroxide slurry was such that the pH of the slurry in the reaction vessel was about 11. The average conductivity of the reactor contents was about 832 μS/cm.

The resultant precipitated calcium carbonate was a coarse prismatic precipitated calcium carbonate (coarse P-PCC) with a weight median grain diameter ($d_{50}$) of 5.5 μm and a BET specific surface area (SSA) of 1.4 m²/g.

Example 3

Inventive Example

In this example the same reactor as in Example 2 was used. Moreover, the reaction was carried out in a similar manner as the reaction described in Example 2.

The 2 liters of tap water provided in the reaction vessel had an initial temperature prior to the gas injection of about 30° C. The initial temperature of the aqueous calcium hydroxide slurry in this example was also about 30° C. The addition rate of the aqueous calcium hydroxide slurry was controlled by a flow of 0.07 l/min. The average conductivity of the reactor contents during the reaction was about 200 μS/cm, and the pH of the slurry during and after the reaction was about 7.

The resultant precipitated calcium carbonate was a rather coarse prismatic precipitated calcium carbonate with a weight median grain diameter ($d_{50}$) of 3.0 μm and a BET specific surface area (SSA) of 2.9 m²/g.

Example 4

Inventive Example

Example 4 was carried out in a similar manner to the reaction described in Example 3, with the exception that the initial temperature of both the tap water and the aqueous calcium hydroxide slurry was about 50° C. The average conductivity of the reactor contents during the reaction was about 200 μS/cm. The pH of the slurry in the reaction vessel was about 7.

The resultant precipitated calcium carbonate was a rather coarse prismatic precipitated calcium carbonate with a weight median grain diameter ($d_{50}$) of 2.9 μm and a BET specific surface area (SSA) of 2.7 m²/g.

Example 5

Inventive Example

Example 5 was carried out in a similar manner to the reaction described in Example 3, with the exception that the initial temperature of the tap water was about 10° C. and the initial temperature of the aqueous calcium hydroxide slurry was about 70° C. The average conductivity of the reactor contents during the reaction was about 200 μS/cm. The pH of the slurry in the reaction vessel was about 7.

The resultant precipitated calcium carbonate was a rather coarse prismatic precipitated calcium carbonate with a weight median grain diameter ($d_{50}$) of 3.8 μm and a BET specific surface area (SSA) of 3.8 m²/g.

Example 6

Inventive Example

Example 6 was carried out in a similar manner to the reaction described in Example 2, with the exception that the addition rate of the aqueous calcium hydroxide slurry was such that the average conductivity of the reactor contents during the reaction was about 245 μS/cm. The pH of the slurry in the reaction vessel was about 7.5.

The resultant precipitated calcium carbonate was a rather coarse prismatic precipitated calcium carbonate with a weight median grain diameter ($d_{50}$) of 3.1 μm and a BET specific surface area (SSA) of 2.7 m$^2$/g.

Example 7

Inventive Example

Example 7 was carried out in a similar manner to the reaction described in Example 2, with the exception that the solid content of the aqueous calcium hydroxide slurry was about 21% by weight instead of about 14% by weight. The average conductivity of the reactor contents during the reaction was about 835 μS/cm.

The resultant precipitated calcium carbonate was a very coarse prismatic precipitated calcium carbonate with a weight median grain diameter ($d_{50}$) of 6.0 μm and a BET specific surface area (SSA) of 2.0 m$^2$/g.

Example 8

Inventive Example—Dispersing Agent

Example 8 was carried out in a similar manner to the reaction described in Example 2, with the exception that a dispersing agent was added to the tap water prior to the addition of the aqueous calcium hydroxide slurry. The dispersing agent used was a polyacrylic acid in its neutralized form (having a $M_w$=12 000 and a polydispersity of 4), and it was added in an amount of 0.02% by weight, based on the dry amount of calcium hydroxide. The average conductivity of the reactor contents during the reaction was about 881 μS/cm.

The resultant precipitated calcium carbonate was a very coarse prismatic precipitated calcium carbonate with a weight median grain diameter ($d_{50}$) of 6.9 μm and a BET specific surface area (SSA) of 1.5 m$^2$/g.

Example 9

Inventive Example—Addition of Additive

Example 9 was carried out in a similar manner to the reaction described in Example 2, with the exception that a slaking additive was not used during the slaking phase, i.e. during the reaction step where the aqueous calcium hydroxide slurry is produced by the addition of quicklime (burnt line, CaO) to tap water, but was added to the tap water prior to the addition of the aqueous calcium hydroxide slurry. The average conductivity of the reactor contents during the reaction was about 1 005 μS/cm. The added additive was sodium citrate.

The resultant precipitated calcium carbonate was a coarse prismatic precipitated calcium carbonate with a weight median grain diameter ($d_{50}$) of 5.8 μm and a BET specific surface area (SSA) of 1.4 m$^2$/g.

Example 10

Inventive Example

This examples demonstrates the production of a scalenohedral precipitated calcium carbonate (S-PCC) using the process of the present invention.

A similar equipment than the one described in Example 2 was used. Moreover, the reaction was carried out in a similar manner as the reaction described in Example 2.

The 2 l of tap water provided in the reaction vessel had an initial temperature prior to the gas injection of about 70° C.

The initial temperature of the aqueous calcium hydroxide slurry in this example was also about 70° C. The addition rate of the aqueous calcium hydroxide slurry was such that the average conductivity of the reactor contents during the reaction was about 1 317 μS/cm. The pH of the slurry was about 11.

The resultant precipitated calcium carbonate was a coarse scalenohedral precipitated calcium carbonate (coarse S-PCC) with a weight median grain diameter ($d_{50}$) of 4.0 μm and a BET specific surface area (SSA) of 2.4 m$^2$/g.

Example 11

Inventive Example

Example 11 was carried out in a similar manner to the reaction described in Example 2, with the exception that addition rate of the aqueous calcium hydroxide slurry was controlled by a flow of 0.10 l/min (corresponding to 0.05 fold/minute per volume of carbonated water). The average conductivity of the reactor contents during the reaction was about 2 415 μS/cm.

The resultant precipitated calcium carbonate was a very coarse scalenohedral precipitated calcium carbonate (S-PCC) with a weight median grain diameter ($d_{50}$) of 5.9 μm and a BET specific surface area (SSA) of 3.2 m$^2$/g.

Example 12

Inventive Example

Example 12 was carried out in a similar manner to the reaction described in Example 11, with the exception that addition rate of the aqueous calcium hydroxide slurry was controlled by a flow of 0.20 l/min (corresponding to 0.10 fold/minute per volume of carbonated water). The average conductivity of the reactor contents during the reaction was about 2 392 μS/cm.

The resultant precipitated calcium carbonate was a very coarse scalenohedral precipitated calcium carbonate (S-PCC) with a weight median grain diameter ($d_{50}$) of 3.3 μm and a BET specific surface area (SSA) of 5.0 m$^2$/g.

Example 13

Inventive Example

Example 13 was carried out in a similar manner to the reaction described in Example 2, with the exception that addition rate of the aqueous calcium hydroxide slurry was such that the average conductivity of the reactor contents during the reaction was about 1 855 μS/cm. The pH of the slurry in the reaction vessel was greater than 12.

The resultant precipitated calcium carbonate was a very coarse scalenohedral precipitated calcium carbonate (S-PCC) with a weight median grain diameter ($d_{50}$) of 4.9 μm and a BET specific surface area (SSA) of 3.8 m$^2$/g.

Example 14

Inventive Example

Example 14 was carried out in a similar manner to the reaction described in Example 2, with the following exceptions 1. the addition rate of the aqueous calcium hydroxide slurry was such that the average conductivity of the reactor contents during the reaction was about 1 687 µS/cm,
2. the initial temperature of the tap water was about 50° C., and
3. the initial temperature of the aqueous calcium hydroxide slurry was about 10° C.

The pH of the slurry in the reaction vessel was greater than 12.

The resultant precipitated calcium carbonate was a very coarse scalenohedral precipitated calcium carbonate (S-PCC) with a weight median grain diameter ($d_{50}$) of 4.8 µm and a BET specific surface area (SSA) of 2.3 m$^2$/g.

Example 15

Inventive Example

This example demonstrates the production of a colloidal precipitated calcium carbonate (C-PCC) using the process of the present invention.

A similar equipment than the one described in Example 2 was used. Moreover, the reaction was carried out in a similar manner as the reaction described in Example 2.

The 2 l of tap water provided in the reaction vessel had an initial temperature prior to the gas injection of about 30° C. The initial temperature of the aqueous calcium hydroxide slurry in this example was also about 30° C. Prior to the addition of the aqueous calcium hydroxide slurry 1.0% by weight of sucrose was added to the tap water. The addition rate of the aqueous calcium hydroxide slurry was such that the average conductivity of the reactor contents during the reaction was about 1 608 µS/cm. The pH of the slurry was about 11.

The resultant precipitated calcium carbonate was a colloidal precipitated calcium carbonate (c-PCC) with a weight median grain diameter ($d_{50}$) of 4.3 µm and a BET specific surface area (SSA) of 12.1 m$^2$/g.

Example 16

Inventive Example

This example refers to work on a pilot scale and shows that the carbonation reaction carried out pursuant to this invention can produce prismatic precipitated calcium carbonate (P-PCC).

In this example a 2 000 liter stainless steel pilot plant reactor was used. The reaction vessel was closed on the top and enables a gas injection from the bottom of the vessel and injection of calcium hydroxide slurry from the top of the vessel. 600 l of tap water were provided in the reaction vessel. The initial temperature of the water prior to the gas injection was about 50° C. Gas containing 20% by volume carbon dioxide was injected at a rate of 200 m$^3$/h into the tap water contained in the reaction vessel until the pH of the water was between 6 and 7. The reaction vessel contents were agitated at 240 rpm. While the injection of the carbon dioxide containing gas was continued, an aqueous calcium hydroxide slurry, the so-called "milk of lime", was added. The initial temperature of the aqueous calcium hydroxide slurry was about 70° C. The solids content of the aqueous calcium hydroxide slurry was about 14% by weight. The addition rate of the aqueous calcium hydroxide slurry was such that the pH of the slurry in the reaction vessel was maintained between 7 and about 7.5.

The average conductivity of the reactor contents during the reaction measured was about 257 µS/cm.

The resultant precipitated calcium carbonate was a coarse prismatic precipitated calcium carbonate (coarse P-PCC) with a weight median grain diameter ($d_{50}$) of 4.5 µm and a BET specific surface area (SSA) of 1.8 m$^2$/g.

Example 17

Inventive Example

Example 17 was carried out in a similar manner to the reaction described in Example 2, with the exception that set point of the electrical conductivity was 1 000 µS/cm. The observed average conductivity of the reactor contents during the reaction was 1 034 µS/cm.

The resultant precipitated calcium carbonate was a coarse prismatic precipitated calcium carbonate with a weight median grain diameter ($d_{50}$) of 4.8 µm and a BET specific surface area (SSA) of 3.5 m$^2$/g.

Example 18

Inventive Example

Example 18 was carried out in a similar manner to the reaction described in Example 9, with the exception that the additive was 0.05% by weight of a sorbitol in solution based on the weight of dry calcium hydroxide. The observed average conductivity of the reactor contents during the reaction was 876 µS/cm.

The resultant precipitated calcium carbonate was a coarse prismatic precipitated calcium carbonate with a weight median grain diameter ($d_{50}$) of 5.1 µm and a BET specific surface area (SSA) of 1.7 m$^2$/g.

Example 19

Inventive Example

Example 19 was carried out in a similar manner to the reaction described in Example 2, with the exception that a slaking additive was not during the slaking phase, i.e. during the reaction step where the aqueous calcium hydroxide slurry is produced by the addition of quicklime (burnt line, CaO) to tap water. The slaking additive used was Meritol. The observed average conductivity of the reactor contents during the reaction was 602 µS/cm.

The resultant precipitated calcium carbonate was a coarse prismatic precipitated calcium carbonate with a weight median grain diameter ($d_{50}$) of 5.3 µm and a BET specific surface area (SSA) of 1.6 m$^2$/g.

Examples 20 and 21

Prior Art

Examples 20 and 21 exemplify the production of scalenohedral precipitated calcium carbonate by the commonly known process where first the calcium hydroxide slurry is introduced into the reaction vessel and then the introduction of carbon dioxide containing gas is started. The initial temperature of the calcium hydroxide slurry before the introduction of the carbon dioxide gas was 30 and 50° C. The measured electrical conductivity was 4496 µS/cm (Example 20) and 3878 µS/cm (Example 21).

The resultant precipitated calcium carbonates were:
a scalenohedral precipitated calcium carbonate with a weight median grain diameter ($d_{50}$) of 1.2 μm and a BET specific surface area (SSA) of 13.0 m²/g (Example 20), and
a scalenohedral precipitated calcium carbonate with a weight median grain diameter ($d_{50}$) of 1.6 μm and a BET specific surface area (SSA) of 5.1 m²/g (Example 21).

Example 22

Inventive Example

This example refers to the industrial production of prismatic precipitated calcium carbonate (P-PCC) according to the present invention.

This example was carried out in a similar way as example 16 (pilot trial), with the following changes:

A 45 000 liter stainless steel industrial reactor was used. 10 000 l of tap water were provided in the reaction vessel. The initial temperature of the water prior to the gas injection was about 30° C. Gas containing 20% by volume carbon dioxide was injected at a rate of 200 m³/h into the tap water contained in the reaction vessel until the pH of the water was between 6 and 7. The reaction vessel contents were agitated. While the injection of the carbon dioxide containing gas was continued, 30 000 l of an aqueous calcium hydroxide slurry was added. The initial temperature of the aqueous calcium hydroxide slurry was about 30° C. The solids content of the aqueous calcium hydroxide slurry was about 11.2% by weight. The addition rate of the aqueous calcium hydroxide slurry was such that the pH of the slurry in the reaction vessel was maintained between 7 and about 7.5.

The average conductivity of the reactor contents during the reaction measured was about 650 μS/cm.

The resultant precipitated calcium carbonate was a coarse prismatic precipitated calcium carbonate (coarse P-PCC) with a weight median grain diameter ($d_{50}$) of 5.95 μm and a BET specific surface area (SSA) of 1.43 m²/g.

Example 23

Inventive Example

This example refers to the industrial production of prismatic precipitated calcium carbonate (S-PCC) according to the present invention.

This example was carried out in a similar way as example 22, with the following changes:

A 45 000 liter stainless steel industrial reactor was used. 10 000 l of tap water were provided in the reaction vessel. The initial temperature of the water prior to the gas injection was about 30° C. Gas containing 20% by volume carbon dioxide was injected at a rate of 200 m³/h into the tap water contained in the reaction vessel until the pH of the water was between 6 and 7. The reaction vessel contents were agitated. While the injection of the carbon dioxide containing gas was continued, 30 000 l of an aqueous calcium hydroxide slurry was added. The initial temperature of the aqueous calcium hydroxide slurry was about 30° C. The solids content of the aqueous calcium hydroxide slurry was about 11.7% by weight. The addition rate of the aqueous calcium hydroxide slurry was such that the pH of the slurry in the reaction vessel was about 11.

The average conductivity of the reactor contents during the reaction measured was about 2120 μS/cm.

The resultant precipitated calcium carbonate was a coarse scalenohedral precipitated calcium carbonate (coarse S-PCC) with a weight median grain diameter ($d_{50}$) of 6.06 μm and a BET specific surface area (SSA) of 4.26 m²/g.

Example 24

Inventive Example

This example refers to the continuous production of prismatic precipitated calcium carbonate (P-PCC) according to the present invention.

In this example a 1 800 liter stainless steel pilot plant reactor was used. 600 l of tap water were provided in the reaction vessel. The initial temperature of the water prior to the gas injection was about 30° C. Gas containing 20% by volume carbon dioxide was injected at a rate of 200 m³/h into the tap water contained in the reaction vessel until the pH of the water was between 6 and 7. The reaction vessel contents were agitated at 240 rpm. While the injection of the carbon dioxide containing gas was continued, an aqueous calcium hydroxide slurry was added. The initial temperature of the aqueous calcium hydroxide slurry was about 50° C. The solids content of the aqueous calcium hydroxide slurry was about 11% by weight. The aqueous calcium hydroxide slurry was obtained by slaking burnt lime (calcium oxide) with 0.1% sodium citrate at a burnt lime/water ratio of 1:7. The addition rate of the aqueous calcium hydroxide slurry was such that the pH of the slurry in the reaction vessel was maintained between 7 and about 7.5.

The addition of the aqueous calcium hydroxide slurry into the reaction vessel was continued for 24 hours, with the overflow of the reactor, i.e. the amount of aqueous calcium hydroxide slurry exceeding the holding capacity of the reaction vessel, being collected in another container and being carbonated with carbon dioxide containing gas for the completion of the reaction.

The average conductivity of the reactor contents during the reaction measured was about 700 μS/cm.

The resultant precipitated calcium carbonate was a coarse prismatic precipitated calcium carbonate (coarse P-PCC) with a weight median grain diameter ($d_{50}$) of 4.8 μm and a BET specific surface area (SSA) of about 2 m²/g.

The physical properties of the products obtained by the process according to the invention as described in the above examples, of products obtained by prior art processes, as well as the reaction conditions are listed in Table 1.

TABLE 1

Physical properties of the products obtained by the process according to the invention and

| Example No. | Invention (IN)/ Prior Art (PA) | PSD Sedigraph $d_{50}$ [μm] | Solid content PCC slurry [%] | SSA [m²/g] | Temp. Aqueous phase [°C.] | Temp. Ca(OH)$_2$ slurry [°C.] | Avg. Conductivity measured [μS/cm] | Crystal habit of PCC |
|---|---|---|---|---|---|---|---|---|
| | | | | | Reaction conditions | | | |
| 1 | PA | 4.2 | 12.6 | 2.2 | 30 | 30 | — | cuboidal |
| 2 | IN | 5.5 | 13.8 | 1.4 | 30 | 70 | 832 | P(*) |
| 3 | IN | 3.0 | 10.6 | 2.9 | 30 | 30 | 188 | P(*) |
| 4 | IN | 2.9 | 12.4 | 2.7 | 50 | 50 | 180 | P(*) |
| 5 | IN | 3.8 | 14.6 | 3.8 | 10 | 70 | 203 | P(*) |
| 6 | IN | 3.1 | 13.4 | 2.7 | 30 | 70 | 245 | P(*) |
| 7 | IN | 6.0 | 21.2 | 2.0 | 30 | 70 | 835 | P(*) |
| 8 | IN | 6.9 | 13.2 | 1.5 | 30 | 70 | 881 | P(*) |
| 9 | IN | 5.8 | 13.3 | 1.4 | 30 | 70 | 1005 | P(*) |
| 10 | IN | 4.0 | 12.4 | 2.4 | 70 | 70 | 1317 | S(**) |
| 11 | IN | 5.9 | 11.9 | 3.2 | 30 | 70 | 2415 | S(**) |
| 12 | IN | 3.3 | 12.0 | 5.0 | 30 | 70 | 2392 | S(**) |
| 13 | IN | 4.9 | 13.0 | 3.8 | 30 | 70 | 1855 | S(**) |
| 14 | IN | 4.8 | 12.6 | 2.3 | 50 | 10 | 1687 | S(**) |
| 15 | IN | 4.3 | 12.6 | 12.1 | 30 | 30 | 1608 | C(*****) |
| 16 | IN | 4.5 | 14.0 | 1.8 | 50 | 70 | 257 | P(*) |
| 17 | IN | 4.8 | 12.7 | 3.5 | 30 | 70 | 1034 (set conductivity: 1000) | P(*) |
| 18 | IN | 5.1 | 12.6 | 1.7 | 30 | 70 | 876 | P(*)(***) |
| 19 | IN | 5.3 | 12.8 | 1.6 | 30 | 70 | 602 | P(*)(***) |
| 20 | PA | 1.2 | 16.2 | 13.0 | — | 30 | 4496 | S(**) |
| 21 | PA | 1.6 | 16.5 | 5.1 | — | 50 | 3878 | S(**) |
| 22 | IN | 6.0 | 11.2 | 1.4 | 30 | 30 | 650 | P(*) |
| 23 | IN | 6.0 | 11.7 | 4.3 | 30 | 30 | 2120 | S(**) |
| 24 | IN | 4.8 | 11.0 | 2 | 30 | 50 | 700 | P(*) |

(*) = prismatic
(**) = scalenohedral
(***) = 0.05% Meritol additive
(****) = 0.05% Meritol slaking additive, i.e. Meritol was added during the preparation of the Ca(OH)$_2$ slurry during slaking
(*****) = colloidal In Table 1, Example 1 shows the result of a product obtained by the known "inverse" carbonation process described in U.S. Pat. No. 4,888,160.

Inventive Examples 2 to 9, and 17 to 19, 22, 23 and 24 demonstrate the production of prismatic precipitated calcium carbonate (P-PCC). From these results one can clearly derive that when the average conductivity is controlled to be in the range of about 100 to about 1 200 μS/cm, then the resulting PCC has a prismatic crystal habit.

Besides, inventive Example 17 demonstrates that the addition rate of the calcium hydroxide slurry can be clearly controlled by the measurement of electrical conductivity of the reaction contents. The set point of the electrical conductivity was 1 000 μS/cm, and the observed electrical conductivity was 1 034 μS/cm.

Furthermore, inventive Examples 18 and 19 demonstrate that additives can be used during the preparation of the Ca(OH)$_2$ slurry as well as during the inventive process without changing the crystal structure of the resulting PCC.

Inventive Examples 10 to 14 demonstrate the production of scalenohedral precipitated calcium carbonate (S-PCC). Again, one can clearly derive that when the average electrical conductivity is controlled to be in the range of greater than about 1 200 to about 6 000 μS/cm, then the resulting PCC has a scalenohedral crystal habit.

Inventive Example 15 demonstrates the production of colloidal precipitated calcium carbonate (C-PCC). One can clearly derive that when the average electrical conductivity is controlled to be in the range of greater than about 1 200 to about 6 000 μS/cm, and an additive such as a sugar, e.g. sucrose, is added to the tap water prior to the addition of the calcium hydroxide slurry, then the resulting PCC is in colloidal form.

In addition, inventive Example 16, and Examples 22 and 23 demonstrate the feasibility of the inventive process in pilot scale and industrial scale, respectively.

Furthermore, Examples 20 and 21 exemplify the production of scalenohedral precipitated calcium carbonate by the commonly known process where first the calcium hydroxide slurry is introduced into the reaction vessel and then the introduction of carbon dioxide containing gas is started. As one can clearly derive from these trials, the precipitated calcium carbonate shows a smaller average mean particle size than the products obtained by the process according to the present invention.

Finally, Example 24 exemplifies the continuous production of scalenohedral precipitated calcium carbonate in pilot scale.

Last but not least, the present invention relates to the use of the aqueous suspension or the dried precipitated calcium carbonate obtained by the inventive process in coating formulations or as fillers in the papermaking industry.

Use of the Precipitated Calcium Carbonate in Paint Applications

Example 25

A. Production of Prismatic Precipitated Calcium Carbonate (P-PCC)

The aqueous calcium hydroxide slurry used was obtained by slaking burnt lime (calcium oxide) with 0.1% sodium citrate at a burnt lime/water ratio of 1:6. The solid content of the aqueous calcium hydroxide slurry was adjusted to about 16 wt.-%, based on the dry weight of the calcium oxide, in a manner known by the skilled person.

In this example a 2 400 liter stainless steel pilot plant reactor was used. 600 l of tap water were provided in the reaction vessel. The initial temperature of the water prior to the gas injection was about 50° C. Gas containing 20% by volume carbon dioxide was injected at a rate of 200 m$^3$/h into the tap water contained in the reaction vessel over a period of 2 minutes. The reaction vessel contents were agitated at 240 rpm. While the injection of the carbon dioxide containing gas was continued, the above described aqueous calcium hydroxide slurry was added to the reaction vessel until 100% of the reactor was filled. The initial temperature of the aqueous calcium hydroxide slurry was about 50° C. The addition rate of the aqueous calcium hydroxide slurry was such that the pH of the slurry in the reaction vessel was maintained between 7 and about 7.5.

The following formulation was used for the preparation of the paints to be evaluated:

| Raw material | Amount in g |
|---|---|
| Water | 341.2 |
| Tylose MH 30 000 YG8 | 4.6 |
| Sodium hydroxide, 10% | 2.1 |
| Mowiplus XW 330 | 3.0 |
| Calgon N new | 1.6 |
| Mergal 723K | 1.1 |
| Byk 032 | 2.0 |
| Butyl diglycol acteate | 3.4 |
| Kristallöl 30 | 16.5 |
| Filler/Pigment obtained in step B.1 and B.2 (density 2.7 g/cm$^3$) | 465.1 |
| Mowilith LDM 6119 | 159.4 |
| Total | 1000.0 |

The manufacturer of the raw materials, their composition as well as their function is listed in the following Table:

| Product | Producer | Chemical basis | Function |
|---|---|---|---|
| Calgon N new | BK Giulini Chemie | Sodium polyphosphate | Wetting and dispersing agent |
| Mergal 723K | Troy Chemie GmbH | Benzisothiazolon basis, without formaldehyde | Preservative |
| Byk 032 | Byk Chemie | Emulsions of paraffin-based mineral oils and hydrophobic components | Defoamer |
| Tylose MH 30 000 YG8 | ShinEtsu | Methyl hydroxyethyl cellulose | Thickening agent |
| Sodium hydroxide, 10% | Misc. | Sodium hydoxide solution | pH regulator |
| Mowiplus XW 330 | Clariant | Ammonium salt of a polyacrylic acid | Wetting and dispersing agent |
| Butyl diglycol acetate | Various | Diethylene glycol monobutyl ether acetate | Coalescing agent |
| Kristallöl 30 | Shell Chemie | Low aromatic white spirit (LAWS) | Solvent |
| Mowilith LDM 1871 ca. 53% | Clariant GmbH | VA/ethylene | Binder (copolymer) |
| Water | — | — | — |

B. Post-Processing of the Prismatic Precipitated Calcium Carbonate (P-PCC) Obtained Under A The prismatic precipitated calcium carbonate obtained under A. was post-processed by the means of two different methods.
1. Post-Processing on a Pilot Centrifuge The slurry obtained in step A was first screened on a 45 μm screen, and then dewatered with a centrifuge of the SC 01 type of the company KHD Humboldt Wedag A D, Köln, Germany, to a solids content of about 70 wt. %.
2. Post-Processing on a Tube Press The slurry obtained in step A was first screened on a 45 μm screen, then dewatered with a Metso Tube Press 500 SC-100 of the company Metso to a solids content of about 83 wt. %. By the use of an appropriate dispersant, the filter cake was redispersed in a Lab Ultramill to a solids content of about 72-74 wt. %.

C. Formulation of Emulsion Paints

Following the post-treatment, emulsion paints were formulated by the use of the obtained prismatic precipitated calcium carbonates, and the ICI viscosity, the Viscosity with a Paar Physica M301 PP25 rheometer, the colour values Rx, Ry, Rz, the contrast ratio, and the gloss 85° properties of the obtained paints were measured and are listed in Table 2.

Two paints with the above formulation have been prepared in a plastic beaker (PP 100 plastic beaker, Art. No. 150200 from Hausschild). One paint formulation contained the filler of step B.1. and the other paint formulation contained the filler of B.2. Then the plastic beaker was closed with the corresponding plastic lid PP 100 lid, Art. No. 150207 from Hausschild), placed in a speed mixer DAC 150 FV, from the company Hausschild, distributed by the company A. H. Meyer & Cie A G, Zürich, Switzerland, and disperse for 4 minutes at 3000 rpm.
Application and Evaluation of the Two Paints The Leneta contrast card was placed on a film coater of the company Zehntner testing instruments, Holstein, Switzerland, comprising a ACC 039 vacuum pump (3.5 m$^3$/h), a modified vacuum plate (ZAA 2300; smaller plate, catch basin) and a draw down bar (ZSC 212 150/300 μm) with a width of coating=80 mm. The draw down bar was adjusted on the Leneta contrast card, and sufficient paint was placed in front of the draw down bar gap. The film coater was set to a speed of approximately 10 mm/s for the application of the paint on the Leneta card. After the coating was completed, the Leneta card was removed and dried at 23° C. and 50% relative humidity for 24 h before determining the optical properties.

The optical properties as well as the viscosity values are listed in Table 2.

|  |  | With Filler of B.1. | With Filler of B.2. |
|---|---|---|---|
| Paint |  |  |  |
| ICI Viscosity | mPas | 180 | 160 |
| Temperature | ° C. | 23 | 23 |
| Paar Physica Viscosity | mPas |  |  |
| Viscosity, $D = 1\ s^{-1}$ | mPas | 28 200 | 23 800 |
| Viscosity, $D = 5\ s^{-1}$ | mPas | 11 200 | 8 980 |
| Viscosity, $D = 10\ s^{-1}$ | mPas | 7 410 | 5 950 |
| Viscosity, $D = 40\ s^{-1}$ | mPas | 3 250 | 2 590 |
| Optical Properties |  |  |  |
| Rx at C2° | % | 89.0 | 88.6 |
| Ry at C2° | % | 88.3 | 87.9 |
| Rz at C2° | % | 83.5 | 82.5 |
| Ry over black at C2° | % | 61.8 | 55.7 |
| Contrast ratio | % | 70.0 | 63.4 |
| Gloss 85° |  | 4.3 | 7.1 |

The above results clearly demonstrate that the products obtained by the inventive process can be used for the formulation of paints.

In addition, the present invention also relates to the use of the dried precipitated calcium carbonate obtained by the inventive process in the field of paints, rubber, plastics, building materials, inks, water treatment, food, feed, and cosmetic.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variants falling within the scope of the following claims and equivalents thereof.

The invention claimed is:

1. A process for the production of prismatic, scalenohedral or colloidal precipitated calcium carbonate, comprising the following steps:
   (a) providing a reaction vessel containing an aqueous water phase at an initial temperature;
   (b) injecting a carbon dioxide generating compound into the aqueous water phase until the pH of the aqueous phase is in the range of pH 5 to pH 7; and
   (c) subsequently adding a calcium hydroxide slurry at an initial temperature to the reaction vessel while continuing the injection of the carbon dioxide generating compound, in order to obtain an aqueous slurry of precipitated calcium carbonate,
   wherein in step (c) the addition rate of the calcium hydroxide slurry to the reaction vessel is such that an average electrical conductivity of the reaction contents in the reaction vessel during the reaction is in a range of 100 to 6000 µS/cm,
   and wherein (i) prismatic precipitated calcium carbonate is obtained when the average electrical conductivity of the reaction contents in the reaction vessel during the reaction is in a range of 100 to 1200 µS/cm, (ii) scalenohedral precipitated calcium carbonate is obtained when the average electrical conductivity of the reaction contents in the reaction vessel during the reaction is in a range of 1200 to 6000 µS/cm, and (iii) colloidal precipitated calcium carbonate is obtained when the average electrical conductivity of the reaction contents in the reaction vessel during the reaction is in a range of 1200 to 6000 µS/cm and the aqueous water phase contains at least one additive to facilitate production of colloidal precipitated calcium carbonate.

2. The process according to claim 1, wherein the pH of the aqueous slurry of the precipitated calcium carbonate is in the range of pH 7 to pH 13.

3. The process according to claim 1, wherein the pH of the aqueous slurry of the precipitated calcium carbonate is in the range of pH 7 to pH 12.

4. The process according to claim 1, wherein the addition rate of the calcium hydroxide slurry in step (c) is at least 0.02 fold/minute per volume of carbonated aqueous phase.

5. The process according to claim 1, wherein the addition rate of the calcium hydroxide slurry in step (c) is in the range of 0.02 to 0.25 fold/minute per volume of carbonated aqueous phase.

6. The process according to claim 1, wherein the addition rate of the calcium hydroxide slurry in step (c) is in the range of 0.025 to 0.10 fold/minute per volume of carbonated aqueous phase.

7. The process according to claim 1, wherein the carbon dioxide generating compound in step (c) is introduced in the reaction vessel at a rate of 0.05 to 2 kg $CO_2$/h per kg of dry $Ca(OH)_2$.

8. The process according to claim 1, wherein the carbon dioxide generating compound in step (c) is introduced in the reaction vessel at a rate of 0.2 to 0.8 kg $CO_2$/h per kg of dry $Ca(OH)_2$.

9. The process according to claim 1, wherein the reaction vessel has a defined filling volume, and the total amount or volume of calcium hydroxide slurry added in step (c) amounts to at least to 10% of the filling volume of the reaction vessel.

10. The process according to claim 1, wherein the initial temperature of the aqueous phase is in a range of 0° C. to 95° C.

11. The process according to claim 1, wherein the initial temperature of the aqueous phase is in a range of 10° C. to 70° C.

12. The process according to claim 1, wherein the initial temperature of the aqueous phase is in a range of 30° C. to 50° C.

13. The process according to claim 1, wherein the initial temperature of calcium hydroxide slurry is in a range of 10° C. to 90° C.

14. The process according to claim 1, wherein the initial temperature of calcium hydroxide slurry is in a range of 30° C. to 80° C.

15. The process according to claim 1, wherein the initial temperature of calcium hydroxide slurry is in a range of 50° C. to 70° C.

16. The process according to claim 1, wherein the carbon dioxide generating compound is selected from the group consisting of gaseous carbon dioxide, liquid carbon dioxide, solid carbon dioxide and a gas containing carbon dioxide.

17. The process according to claim 1, wherein the carbon dioxide generating compound is a gaseous mixture of carbon dioxide and air.

18. The process according to claim 1, wherein the carbon dioxide generating compound is a gaseous mixture of carbon dioxide and nitrogen.

19. The process according to claim 1, wherein the calcium hydroxide slurry is an aqueous calcium hydroxide slurry and has a solid content between 1% and 30% by weight.

20. The process according to claim 1, wherein the calcium hydroxide slurry is an aqueous calcium hydroxide slurry and has a solid content between 5% and 25% by weight.

21. The process according to claim 1, wherein the calcium hydroxide slurry is an aqueous calcium hydroxide slurry and has a solid content between 10% and 20% by weight.

22. The process according to claim 1, wherein the aqueous slurry of the precipitated calcium carbonate obtained in step (c) has a solid content between 5% and 30% by weight.

23. The process according to claim 1, wherein the aqueous slurry of the precipitated calcium carbonate obtained in step (c) has a solid content between 7% and 25% by weight.

24. The process according to claim 1, wherein the aqueous slurry of the precipitated calcium carbonate obtained in step (c) has a solid content between 10% and 20% by weight.

25. The process according to claim 1, wherein the precipitated calcium carbonate has a weight median grain diameter ($d_{50}$) in a range of 1.0 to 9.0 μm.

26. The process according to claim 1, wherein the precipitated calcium carbonate has a weight median grain diameter ($d_{50}$) in a range of 2.5 to 7.5 μm.

27. The process according to claim 1, wherein the precipitated calcium carbonate has a weight median grain diameter ($d_{50}$) in a range of 3.3 to 6.9 μm.

28. The process according to claim 1, wherein the precipitated calcium carbonate has a BET specified surface area in a range of 1.0 to 25.0 $m^2/g$.

29. The process according to claim 1, wherein the precipitated calcium carbonate has a BET specified surface area in a range of 1.3 to 23.5 $m^2/g$.

30. The process according to claim 1, wherein the precipitated calcium carbonate has a BET specified surface area in a range of 1.3 to 5.0 $m^2/g$.

31. The process according to claim 1, wherein after step (a) or after step (b) but prior to step (c) an additive is added to the reaction vessel.

32. The process according to claim 31, wherein the additive is one selected from the group consisting of a slaking additive, a precipitation additive and a dispersing agent.

33. The process according to claim 31, wherein the additive is one selected from the group consisting of a sugar; a sugar alcohol; citric acid; a sodium, potassium, calcium or magnesium salt of citric acid; and a polyacrylic acid in neutralized or partly neutralized form.

34. The process according to claim 1, wherein the average electrical conductivity is controlled in a range of 100 to 1200 μS/cm.

35. The process according to claim 1, wherein the average electrical conductivity is controlled in a range of 200 to 1010 μS/cm.

36. The process according to claim 1, wherein the average electrical conductivity is controlled in a range of greater than 1200 to 6000 μS/cm.

37. The process according to claim 1, wherein the average electrical conductivity is controlled in a range of 1300 to 3000 μS/cm.

38. The process according to claim 1, wherein the average electrical conductivity is controlled in a range of 1300 to 2500 μS/cm.

39. The process according to claim 1, wherein the process is carried out in a batch mode.

40. The process according to claim 1, wherein the process is carried out in a batch semi-mode.

41. The process according to claim 1, wherein the process is carried out in a continuous mode.

42. The process according to claim 1, further comprising drying the precipitated calcium carbonate to form dried precipitated calcium carbonate.

43. The process according to claim 1, wherein the at least one additive to facilitate production of colloidal precipitated calcium carbonate is a sugar.

44. The process according to claim 1, wherein the at least one additive to facilitate production of colloidal precipitated calcium carbonate is sucrose.

45. The process according to claim 1, wherein prismatic precipitated calcium carbonate is obtained.

46. The process according to claim 1, wherein scalenohedral precipitated calcium carbonate is obtained.

47. The process according to claim 1, wherein colloidal precipitated calcium carbonate is obtained.

* * * * *